United States Patent [19]
Gibbons et al.

[11] 3,859,074
[45] Jan. 7, 1975

[54] ISOTHIAZOLOPYRIMIDINE HERBICIDES AND METHOD OF CONTROLLING PLANT GROWTH

[75] Inventors: Loren Kenneth Gibbons, Medina; Arthur Albert Ramsey, Middleport, both of N.Y.

[73] Assignee: FMC Corporation, New York, N.Y.

[22] Filed: Aug. 30, 1973

[21] Appl. No.: 393,073

Related U.S. Application Data

[62] Division of Ser. No. 189,780, Oct. 15, 1971, Pat. No. 3,816,420.

[52] U.S. Cl. .................................................. 71/90
[51] Int. Cl. ............................................. A01n 9/12
[58] Field of Search ......................................... 71/90

[56] References Cited
UNITED STATES PATENTS

| | | | |
|---|---|---|---|
| 3,080,364 | 3/1963 | Schroeder et al. | 71/90 |
| 3,707,364 | 12/1972 | Beeke et al. | 71/90 |

*Primary Examiner*—Lewis Gotts
*Assistant Examiner*—Catherine L. Mills

[57] ABSTRACT

A new class of herbicidal compounds consisting of 3,6-dialkylisothiazolo[3,4-d]pyrimidin-4(5H)-ones exhibits pre-emergence and post-emergence herbicidal activity, controlling effectively a wide spectrum of grassy and broad-leafed plant species at rates below one-half pound per acre. The synthesis of members of this class is described in detail, and the utility of representative compounds is exemplified.

16 Claims, No Drawings

3,859,074

1

ISOTHIAZOLOPYRIMIDINE HERBICIDES AND METHOD OF CONTROLLING PLANT GROWTH

This is a division of application Ser. No. 189,780 filed Oct. 15, 1971 now issued as U.S. Pat. No. 3,816,420.

BACKGROUND OF THE INVENTION

1. Field of the Invention

This invention pertains to the general field of herbicides, and particularly to compositions which control plant growth.

2. Description of the Prior Art

Analogous herbicidal compounds are described in copending U.S. Patent applications Ser. No. 31,414, filed Apr. 23, 1970, now U.S. Pat. No. 3,679,682 and Ser. No. 189,779 and Ser. No. 189,781, filed Oct. 15, 1971.

Neither the isothiazolo[3,4-d]pyrimidin-4-one compounds of the present invention, nor the outstanding plant responses in pre-emergence and post-emergence herbicidal activity of the compounds of the present invention, have been previously reported or suggested in the art.

SUMMARY OF THE INVENTION

This invention relates to novel herbicidal compounds, to new herbicidal compositions, and to new methods for the control of undesired plant growth by pre-emergence and post-emergence application of said new and useful herbicidal compositions.

The novel herbicidal compounds of this invention are substituted isothiazolopyrimidines. The structure of these compounds is given in the following formula:

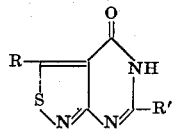

in which R and R' may be the same or different members of the group consisting of straight or branched lower aliphatic radicals (1 to 4 carbon atoms).

Preferred herbicidal isothiazolopyrimidines of this invention are those compounds in which both R and R' are hydrocarbon radicals. Particularly preferred are those compounds in which one of R and R' is isopropyl or tert-butyl, and the other is a hydrocarbon radical of 1 to 3 carbon atoms or tert-butyl.

Effective herbicidal control of the growth of a wide variety of grassy and broad-leafed plant species is obtained at rates below one-half pound per acre. The herbicidal compositions may be applied and utilized by commonly accepted methods.

DETAILED DESCRIPTION OF THE INVENTION AND THE PREFERRED EMBODIMENTS

The new class of herbicidal compounds of this invention has the formula:

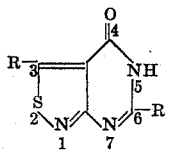

in which R and R' may be the same or different members of the group consisting of straight or branched lower aliphatic radicals (1 to 4 carbon atoms).

2

The preparation of the new isothiazolopyrimidines of this invention may be conveniently carried out from readily available materials. Methods of synthesis are illustrated by the following schema, wherein a herbicidal isothiazolopyrimidine of the invention is designated V, and R and R' have the significance set forth above.

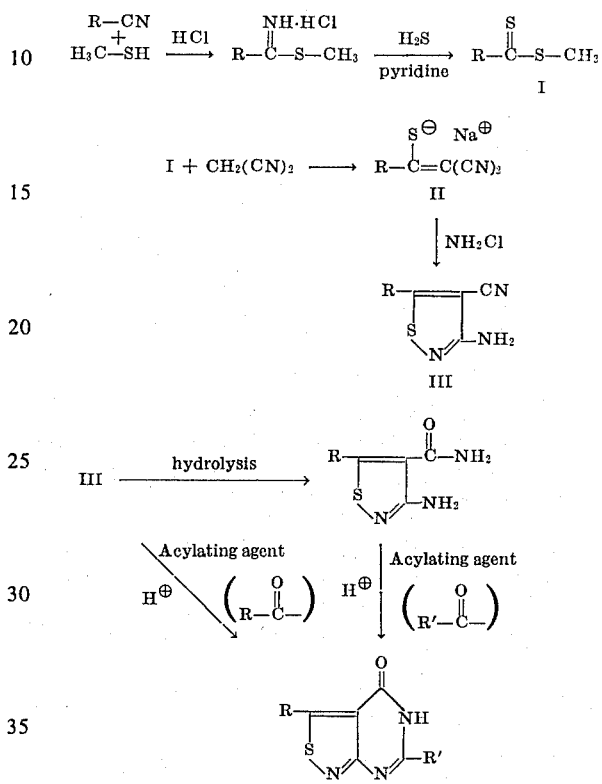

While methods for preparing intermediates used in the synthesis of the isothiazolopyrimidines of this invention have previously been described, in order that the new compounds of this invention may be readily available to those skilled in the art, the methods for the preparation of those intermediates used in the examples are summarized briefly below. The examples describing the synthesis of the isothiazolopyrimidines follow the description of the preparation of the intermediates. All temperatures are in degrees centigrade. All reduced pressures not otherwise specified are the reduced pressure normally attainable with a water aspirator.

The intermediate methyl dithioalkanoates (I of the schema) were prepared by the reaction of methyl mercaptan and hydrogen chloride with the appropriate alkanenitrile, followed by thiohydrolysis in pyridine with hydrogen sulfide. This procedure has been described by Mayer, Scheithauer & Kunz, Chem. Ber. 99,1393 (1966). The following compounds were prepared:
methyl dithioacetate, b.p. 50°–51°/30mm Hg;
methyl dithiopropionate, b.p. 75°/40mm Hg;
methyl dithiobutyrate, b.p. 76°/29mm Hg;
methyl dithioisobutyrate, b.p. 48°–51°/8mm Hg;
methyl dithiotrimethylacetate, b.p. 65°–67°/12mm Hg.

An alternate to the method of Mayer et al for preparation of dithioesters (I) is the method of Peak and Stansfield, J. Chem. Soc., 4067 (1966), employing the Willgerodt-Kindler reaction to form a thioalkylmorpholide, followed by methylation and then thiohydrolsis.

Dithioesters (I) react with malononitrile to form the sodium salt of the desired 2-cyano-3-mercapto-2-alkenenitrile (II of the schema) by the method of Hartke and Peshkar, Archiv. Pharm. 301, 601 (1968). Sodium salts of the following compounds were prepared:

2-cyano-3-mercapto-2-butenenitrile;
2-cyano-3-mercapto-2-pentenenitrile;
2-cyano-3-mercapto-4-methyl-2-pentenenitrile;
2-cyano-3-mercapto-4,4-dimethyl-2-pentenenitrile;
and 2-cyano-3-mercapto-2-hexenenitrile.

The sodium salts are used in the next step without rigorous purification.

The sodium salt (II) is converted to 3-amino-4-cyano-5-alkylisothiazole (III of the schema) by a method similar to that of Hartke and Peshkar, Archiv. Pharm. 301, 611 (1968), involving reaction with monochloramine, formed from ammonium hydroxide and sodium hypochlorite. The following compounds were prepared and their structures were verified by infrared and nmr spectral analysis:

3-amino-4-cyano-5-methylisothiazole, m.p. 176.5°–177.5°;
3-amino-4-cyano-5-ethylisothiazole, m.p. 153.5°–155°;
3-amino-4-cyano-5-isopropylisothiazole, m.p. 83°–85°;
3-amino-5-tert-butyl-4-cyanoisothiazole, m.p. 45°–50°;
3-amino-4-cyano-5-propylisothiazole, m.p. 123.5°–124.5°.

Intermediate 3-amino-5-alkylisothiazole-4-carboxamides (IV of the schema) were prepared by hydrolyzing the appropriate 3-amino-4-cyano-5-alkylisothiazoles with concentrated sulfuric acid. The following compounds were prepared and their structures were verified by infrared or nmr spectral analysis:

3-amino-5-isopropylisothiazole-4-carboxamide, m.p. 195.5°–197.5°;
3-amino-5-tert-butylisothiazole-4-carboxamide, m.p. 118°–120°.

The methods used for the preparation of the isothiazolopyrimidines of the invention (V in the schema) are described in the following examples:

EXAMPLE I

6-Ethyl-3-isopropylisothiazolo[3,4-d]pyrimidin-4(5H)-one

One ml of concentrated sulfuric acid was added dropwise to a suspension of 2 g of 3-amino-4-cyano-5-isopropylisothiazole in 4 ml of propionic anhydride at 0°. The reaction mixture was heated for one hour on a steam bath and poured onto crushed ice. The suspension was filtered and the filtrate was made basic with dilute ammonium hydroxide to yield 2.1 g of product; m.p. 160°–161°. An additional 0.9 g sample of product (m.p. 162.5°–163.5°) was prepared in a similar manner. The solids were combined and recrystallized twice from ethyl acetate-hexane to give purified 6-ethyl-3-isopropylisothiazolo[3,4-d]pyrimidin-4(5H)-one; m.p. 167°–168.5°.

Analysis: Calc'd for $C_{10}H_{13}N_3OS$: C 53.80; H 5.87; N 18.83
Found: C 53.39; H 5.68; N 18.71

EXAMPLE II

3-Isopropyl-6-propylisothiazolo[3,4-d]pyrimidin-4(5H)-one

By the method of Example I, 3.6 ml of concentrated sulfuric acid was slowly added to a mixture of 5.9 g of 3-amino-4-cyano-5-isopropylisothiazole in 25 ml of butyric anhydride, maintaining the temperature at 5°–20° throughout the addition. The mixture was treated as in Example I to obtain a white solid. This solid was dissolved in 20 ml of glacial acetic acid and the solution heated at 50° for 1 hour. The hot solution was filtered and poured into 200 ml of water and the slurry thus obtained was cooled in an ice-bath. The solid was collected and recrystallized from ethanol-water to give 1.8 g of 3-isopropyl-6-propylisothiazolo[3,4-d]pyrimidin-4(5H)-one, m.p. 102°–104°. The ir and nmr spectra of the product were consistent with the assigned structure.

Analysis: Calc'd for $C_{11}H_{15}N_3OS$: C 55.67; H 6.37; N 17.70
Found: C 55.68; H 6.20; N 17.63

EXAMPLE III 3,6-Diisopropylisothiazolo[3,4-d]pyrimidin-4(5H)-one

By the method of Example I, a mixture of 7 g of 3-amino-4-cyano-5-isopropylisothiazole and 14.4 g of isobutyric anhydride was treated with 5 ml of concentrated sulfuric acid and the mixture heated on a steambath for 1.75 hours. The hot reaction mixture was poured onto crushed-ice and water. The precipitated product was recrystallized twice from methanol-water to give 5.7 g of 3,6-diisopropylisothiazolo[3,4-d]pyrimidin-4(5H)-one; m.p. 155°–157°. The ir and nmr spectra of the product were consistent with the assigned structure.

Analysis: Calc'd for $C_{11}H_{15}N_3OS$: C 55.68; H 6.37; N 17.71
Found: C 55.86; H 6.60; N 17.67

EXAMPLE IV 6-tert-Butyl-3-isopropylisothiazolo[3,4-d]pyrimidin-4(5H)-one

To a mixture of 10 g of 3-amino-4-cyano-5-isopropylisothiazole and 15.6 g of trimethylacetyl chloride was slowly added 7 ml of concentrated sulfuric acid. The temperature of the reaction mixture slowly increased to 80° during the addition. The mixture was heated at 125° for 2 hours and the hot mixture was poured into ice-water. The mixture was neutralized to pH 7.5 by addition of sodium bicarbonate. The solid was isolated and dried to give 8.9 g of crude 6-tert-butyl-3-isopropylisothiazolo-[3,4-d]pyrimidin-4(5H)-one, m.p. 202°–204°. Recrystallization from methanol-water increased the melting point to 202.5°–203.5°. The ir and nmr spectra were consistent with the assigned structure.

Analysis: Calc'd for $C_{12}H_{17}N_3OS$: C 57.11; H 7.18; N 16.65
Found: C 56.85; H 6.93; N 16.76

EXAMPLE V

3-Isopropyl-6-methylisothiazolo[3,4-d]pyrimidin-4(5H)-one

By the procedure of Example I, a suspension of 10 g of 3-amino-4-cyano-5-isopropylisothiazole in 13.3 g of acetic anhydride was treated dropwise with 7 ml of concentrated sulfuric acid at 0°–5°. The suspension was heated on a steam bath for one hour, poured over ice and extracted with ethyl acetate. The ethyl acetate extracts were concentrated under reduced pressure to give solid product. This product was recrystallized several times from ethyl acetate at −80° to give 9.0 g of 3-isopropyl-6-methylisothiazolo[3,4-d]pyrimidin-4(5H)-one; m.p. 204°–206°. The ir and nmr spectra of the product were consistent with the assigned structure.

Analysis: Calc'd for $C_9H_{11}N_3OS$: C 51.67; H 5.30; N 20.09
Found: C 51.51; H 5.07; N 19.87

EXAMPLE VI

3-Ethyl-6-isopropylisothiazolo[3,4-d]pyrimidin-4(5H)-one

By the method of Example I, a mixture of 7 g of 3-amino-4-cyano-5-ethylisothiazole and 15.8 g of isobutyric anhydride was treated with 5 ml of concentrated sulfuric acid and the mixture heated on a steam-bath for 1.75 hours, then poured into ice-water. The aqueous mixture was extracted thrice with ethyl acetate, the extracts combined and concentrated by evaporation under reduced pressure to give an oil which crystallized at dry ice temperature. The solid was recrystallized from cyclohexanehexane to give 3.1 g of 3-ethyl-6-isopropylisothiazolo[3,4-d]pyrimidin-4(5H)-one, m.p. 150°–151°. The ir and nmr spectra were consistent with the assigned structure.

Analysis: Calc'd for $C_{10}H_{13}N_3OS$: C 53.80; H 5.87; N 18.83
Found: C 53.65; H 6.04; N 18.46

EXAMPLE VII 6-tert-Butyl-3-ethylisothiazolo[3,4-d]pyrimidin-4(5H)-one

By the method of Example IV, 15.6 g of trimethylacetic anhydride and 10 g of 3-amino-4-cyano-5-ethylisothiazole were reacted in the presence of 7 ml of concentrated sulfuric acid to give 15.7 g of 6-tert-butyl-3-ethylisothiazolo[3,4-d]pyrimidin-4(5H)-one; m.p. 198.5°–199.5° on recrystallization from methanolwater. The ir and nmr spectra were consistent with the assigned structure.

Analysis: Calc'd for $C_{11}H_{15}N_3OS$: C 55.68; H 6.37; N 17.71
Found: C 55.78; H 6.31; N 17.47

EXAMPLE VIII 6-tert-Butyl-3-propylisothiazolo[3,4-d]pyrimidin-4(5H)-one

A mixture of 7.8 g of 3-amino-4-cyano-5-propylisothiazole and 11.2 g of trimethylacetyl chloride was heated to 55° and, while maintaining the temperature below 60°, 5.2 ml of concentrated sulfuric acid was added dropwise. The mixture was then heated at 125° for 2 hours. The acid was neutralized by addition of saturated sodium bicarbonate until the pH was 7.5 and the solid isolated by filtration. Recrystallization from methanol-water gave 5.6 g of 6-tert-butyl-3-propylisothiazolo[3,4-d]pyrimidin-4(5H)-one, m.p. 159°–161°. The ir and nmr spectra of the product were consistent with the assigned structure.

Analysis: Calc'd for $C_{12}H_{17}N_3OS$: C 57.35; H 6.82; N 16.72
Found: C 57.35; H 6.75; N 16.87

EXAMPLE IX 3-tert-Butyl-6-ethylisothiazolo[3,4-d]pyrimidin-4(5H)-one

Three hundred ml of concentrated sulfuric acid was slowly added to 37.5 g of 3-amino-5-tert-butyl-4-cyano-isothiazole while maintaining the temperature below 50°. The mixture was then heated at 55° for 3.5 hours. The hot mixture was poured into ice-water and the solution neutralized (to pH 9) by addition of concentrated ammonium hydroxide. The solution was extracted thrice with ethyl acetate and the combined extracts evaporated to dryness to give 36.6 g of solid which by recrystallization from toluene gave 18.7 g of 3-amino-5-tert-butylisothiazole-4-carboxamide, m.p. 142°–143°. The ir and nmr spectra were consistent with the assigned structure.

Analysis: Calc'd for $C_8H_{13}N_3OS$: C 48.23; H 6.58; N 21.10
Found: C 48.21; H 6.86; N 20.98

A mixture of 5 g of 3-amino-5-tert-butylisothiazole-4-carboxamide and 10 ml of propionic anhydride was cooled to 0° and to it was slowly added, while maintaining the temperature below 0°, 2 ml of concentrated sulfuric acid. The mixture was then heated for 2.5 hours on a steam-bath and the hot mixture poured into ice-water. The white solid was isolated and the aqueous filtrate extracted thrice with ethyl acetate. The combined extracts were concentrated by evaporation to dryness under reduced pressure. The residue and previously isolated solid were combined and recrystallized from methanol-water to give 5.4 g of 3-tert-butyl-6-ethyl-isothiazolo[3,4-d]pyrimidin-4(5H)-one, m.p. 179°–180°. This product was identical with the product obtained by reaction of propionic anhydride and 3-amino-5-tert-butyl-4-cyanoisothiazole according to the method of Example I.

The ir and nmr spectra of the product were consistent with the assigned structure:

Analysis: Calc'd for $C_{11}H_{15}N_3OS$: C 55.68; H 6.37; N 17.71
Found: C 55.94; H 6.30; N 17.86

The following additional compounds of the invention were prepared by methods exemplified above:

Example X.
  3-tert-Butyl-6-methylisothiazolo[3,4-d]pyrimidin-4(5H)-one, m.p. 206°–207°.

Example XI.
  6-Ethyl-3-propylisothiazolo[3,4-d]pyrimidin-4(5H)-one, m.p. 132.5°–133.5°.

Example XII.
  6-Isopropyl-3-methylisothiazolo[3,4-d]pyrimidin-4(5H)-one, m.p. 182.5°–184.5°.

Example XIII.
  6-Ethyl-3-methylisothiazolo[3,4-d]pyrimidin-4(5H)-one, m.p. 245°–246°.

Example XIV.
  3,6-Diethylisothiazolo[3,4-d]pyrimidin-4(5H)-one, m.p. 158°–159°.

Example XV.
  6-Methyl-3-propylisothiazolo[3,4-d]pyrimidin-4(5H)-one, m.p. 183°–184°.

Example XVI.
  3-Ethyl-6-methylisothiazolo[3,4-d]pyrimidin-4(5H)-one, m.p. 249°–250°.

Example XVII.
  6-Isopropyl-3-propylisothiazolo[3,4-d]pyrimidin-4(5H)-one, m.p. 154°–155°.

Example XVIII.
  6-tert-Butyl-3-methylisothiazolo[3,4-d]pyrimidin-4(5H)-one, m.p. 236°–237.5°.

Example XIX.
  3-tert-Butyl-6-isopropylisothiazolo[3,4-d]pyrimidin-4(5H)-one, m.p. 220°–223°.

Example XX.
  3,6-Di-tert-butylisothiazolo[3,4-d]pyrimidin-4(5H)-one, m.p. 287°–289°.

The biological activity of the compounds of this invention was demonstrated in standard herbicidal tests. The test methods and test results were as follows:

For pre-emergence herbicidal tests, seeds of lima beans (*Phaseolus lunatus*), corn (*Zea mays*), lettuce (*Lactuca sativa*), mustard (*Brassica juncea*), and crabgrass (*Digitaria sanguinalis*) were planted in shallow flat-bed trays containing two to three inches of loam soil. Within twenty-four hours after planting an aqueous-acetone solution of the compound being tested was sprayed on the soil at a rate of 8 pounds active ingredient per acre. Test plants were maintained in a greenhouse and watered regularly for two weeks, after which time the phytotoxicity of the compound was recorded. Individual plant species were examined for per cent kill and vigor. Untreated control plants were maintained in every test carried out.

Table I lists results of pre-emergence herbicidal testing:

Table I

Pre-emergence Evaluation of Compounds at 8 lb/acre

| Compound of Example | Test Plant Species | | | | |
|---|---|---|---|---|---|
| | Lima Beans | Corn | Lettuce | Mustard | Crabgrass |
| I | 0* | 0 | 0* | 100 | 30 |
| II | 100 | 70* | 100 | 100 | 100 |
| III | 100 | 100 | 100 | 100 | 95* |
| IV | 100 | 100 | 100 | 100 | 100 |
| V | 100 | 70* | 100 | 100 | 90* |
| VI | 90* | 100 | 100 | 100 | 100 |
| VII | 100 | 100 | 100 | 100 | 90* |
| VIII | 100 | 100 | 100 | 100 | 100 |
| IX | 100 | 0* | 90* | 100 | 90* |
| X | 100 | 0 | 100 | 100 | 100 |
| XI | 100 | 70* | 100 | 100 | 100 |
| XII | 100 | 70* | 100 | 100 | 100 |
| XIII | 100 | 70 | 100 | 100 | 100 |
| XIV | 100 | 70* | 95* | 100 | 100 |
| XV | 25 | 0 | 100 | 100 | 100 |
| XVI | 90* | 0* | 95* | 100 | 100 |
| XVII | 100 | 100 | 100 | 100 | 100 |
| XVIII | 100 | 100 | 100 | 100 | 100 |
| XIX | 90* | 0* | 90* | 100 | 100 |
| XX | 100 | 0 | 70* | 100 | 100 |

*Plants not dead were severely damaged and not expected to live.

For post-emergence herbicidal tests the test crop seeds were planted in shallow flat-bed trays containing two to three inches of a loam soil. The growth trays were maintained in a greenhouse and regularly watered for approximately two weeks. When the first trifoliate leaves of bean plants were unfolding, the test plants were removed from the greenhouse and sprayed with a aqueous-acetone solution of the compound being tested at a rate of 8 pounds active ingredient per acre. The plants were maintained in the greenhouse and watered regularly for an additional two weeks, after which time the phytotoxicity of the compound was recorded. Individual plant species were examined for per cent kill and vigor. Untreated control plants were maintained in every test carried out.

Table II lists the results of post-emergence herbicidal testing:

Table II

Post-emergence Evaluation of Compounds at 8 lb/acre

| Compound of Example | Test Plant Species | | | | |
|---|---|---|---|---|---|
| | Lima Beans | Corn | Lettuce | Mustard | Crabgrass |
| I | 100 | 100 | 100 | 100 | 100 |
| II | 0 | 0 | 0 | 20 | 0 |
| III | 100 | 100 | 100 | 100 | 100 |
| IV | 100 | 100 | 100 | 100 | 100 |
| V | 100 | 100 | 100 | 100 | 100 |
| VI | 100 | 100 | 100 | 100 | 100 |
| VII | 100 | 100 | 100 | 100 | 100 |
| VIII | 100 | 100 | 100 | 100 | 100 |
| IX | 100 | 70* | 100 | 100 | 100 |
| X | 100 | 30* | 100 | 100 | 100 |
| XI | 100 | 100 | 100 | 100 | 100 |
| XII | 100 | 100 | 100 | 100 | 100 |
| XIII | 100 | 70* | 100 | 100 | 100 |
| XIV | 100 | 50 | 100 | 100 | 100 |
| XV | 100 | 30* | 100 | 100 | 100 |
| XVI | 100 | 90* | 100 | 100 | 100 |
| XVII | 100 | 100 | 100 | 100 | 100 |
| XVIII | 100 | 100 | 100 | 100 | 100 |
| XIX | 100 | 30 | 100 | 100 | 100 |
| XX | 30* | 0 | 0 | 0 | 0 |

*Plants not dead were severely damaged and not expected to live.

For herbicidal applications, the isothiazolopyrimidines of this invention may be utilized in diverse formulations, including the agricultural adjuvants and agricultural carriers, i.e., those materials normally employed to facilitate the dispersion of active ingredients in agricultural applications, recognizing the fact that the formulation and mode of application of a toxicant may affect the activity of the material in a given application. Thus, a compound of this invention may be formulated as a granule of relatively large particle size, as a wettable powder, as a emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips or coarse talc. Particularly useful is a granule wherein a wettable powder is applied as a surface coating to a sand or other insoluble particle such that the wettable powder may be dispersed on contact of the granule with moisture. Granules may may be produced by agglomeration of dusts or powders by compaction rollers, by extrusion through a die or by use of a granulating disc. Granular formulations may vary widely in concentration, with useful formulations containing as little as 0.5 percent or as much as 95 percent of active ingredient.

Wettable powders, also useful formulations for both pre- and post-emergence herbicides, are in the form of finely divided particles which disperse readily in water or other dispersants. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5 percent to 80 percent of active ingredient, depending on the absorbency of the carrier, and usually also contain a small amount of a wetting, dispersing or emulsifying agent to facilitate dispersion. For example, a useful wettable powder formulation contains 80.8 parts of an isothiazolopyrimidine of this invention, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of the compound of this invention with a liquid or solid emulsifying agent, or may also contain an agriculturally acceptable liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1 percent to 15 percent weight of the herbicidal composition.

These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The active herbicidal compounds of this invention may be formulated and/or applied with insecticides, fungicides, nematocides, plant-growth regulators, fertilizers, and other agricultural chemicals. In applying an active compound of this invention, whether formulated alone or with other agricultural chemicals, an effective amount and concentration of an isothiazolopyrimidine are of course employed.

It is apparent that various modifications may be made in the formulation and application of the novel compounds of this invention, without departing from the inventive concept herein, as defined in the following claims.

We claim;
1. An herbicidal composition containing, as active ingredient, an effective amount of a compound of the formula:

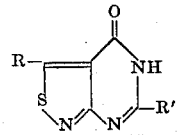

wherein R and R' are members of the group consisting of straight and branched alkyl radicals of 1 to 4 carbon atoms, in admixture with an agricultural carrier.

2. An herbicidal composition of claim 1 in which R is a member of the group consisting of methyl, ethyl propyl, isopropyl and tert-butyl radicals; and R' is a member of the group consisting of isopropyl and tert-butyl radicals.

3. An herbicidal composition of claim 1 in which R is a member of the group consisting of isopropyl and tert-butyl radicals and R' is a member of the group consisting of methyl, ethyl, propyl, isopropyl and tert-butyl radicals.

4. An herbicidal composition of claim 1 in which the compound is 3,6-diisopropylisothiazolo[3,4-d]pyrimidin-4(5H)-one.

5. An herbicidal composition of claim 1 in which the compound is 6-tert-butyl-3-isopropylisothiazolo[3,4-d]pyrimidin-4(5H)-one.

6. An herbicidal composition of claim 1 in which the compound is 6-tert-butyl-3-propylisothiazolo[3,4-d]pyrimidin-4(5H)-one.

7. An herbicidal composition of claim 1 in which the compound is 6-tert-butyl-3-ethylisothiazolo[3,4-d]pyrimidin-4(5H)-one.

8. An herbicidal composition of claim 1 in which the compound is 6-ethyl-3-isopropylisothiazolo[3,4-d]pyrimidin-4(5H)-one.

9. A method of controlling undesired plant growth which comprises applying to the locus where control is desired an effective amount of a compound of the formula:

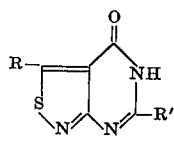

wherein R and R' are members of the group consisting of straight and branched alkyl radicals of 1 to 4 carbon atoms.

10. A method according to claim 9 in which R is a member of the group consisting of methyl, ethyl, propyl, isopropyl and tert-butyl radicals; and R' is a member of the group consisting of isopropyl and tert-butyl radicals.

11. A method according to claim 9 in which R is a member of the group consisting of isopropyl and tert-butyl radicals and R' is a member of the group consisting of methyl, ethyl, propyl, isopropyl and tert-butyl radicals.

12. A method according to claim 9 in which the compound is 3,6-diisopropylisothiazolo[3,4-d]pyrimidin-4(5H)-one.

13. A method according to claim 9 in which the compound is 6-tert-butyl-3-isopropylisothiazolo[3,4-d]pyrimidin-4(5H)-one.

14. A method according to claim 9 in which the compound is 6-tert-butyl-3-propylisothiazolo[3,4-d]pyrimidin-4(5H)-one.

15. A method according to claim 9 in which the compound is 6-tert-butyl-3-ethylisothiazolo[3,4-d]pyrimidin-4(5H)-one.

16. A method according to claim 9 in which the compound is 6-ethyl-3-isopropylisothiazolo[3,4-d]pyrimidin-4(5H)-one.

* * * * *

UNITED STATES PATENT OFFICE
CERTIFICATE OF CORRECTION

PATENT NO. : 3,859,074
DATED : January 7, 1975
INVENTOR(S) : L.K.Gibbons and A.A.Ramsey It is certified that error appears in the above-identified patent and that said Letters Patent are hereby corrected as shown below:

Column 1, formula at lines 60-65, "R" at 6-position should be ---R'---.

Column 5, line 46, insert hyphen between "cyclohexane" and "hexane".

Column 5, line 66, insert hyphen between "methanol" and "water".

Column 10, line 2, after "15 percent", insert ---by---.

Signed and Sealed this second Day of December 1975

[SEAL]

Attest:

RUTH C. MASON
Attesting Officer

C. MARSHALL DANN
Commissioner of Patents and Trademarks